United States Patent [19]

Engira

[11] Patent Number: 6,023,418
[45] Date of Patent: Feb. 8, 2000

[54] LOW VOLTAGE POLARITY CORRECTING DC TO DC CONVERTER

[75] Inventor: Ram M. Engira, West Allis, Wis.

[73] Assignee: Cardiac Evaluation Center, Inc., Milwaukee, Wis.

[21] Appl. No.: 09/301,994

[22] Filed: Apr. 29, 1999

[51] Int. Cl.[7] .............................. H02M 7/02; H02J 7/00
[52] U.S. Cl. ........................... 363/63; 320/165; 320/131
[58] Field of Search ................... 363/63, 70, 95; 320/165, 131; 307/146, 127

[56] References Cited

U.S. PATENT DOCUMENTS

| | | | |
|---|---|---|---|
| 4,691,158 | 9/1987 | Hashimoto et al. | 320/131 |
| 5,541,495 | 7/1996 | Gali | 320/26 |
| 5,940,280 | 8/1999 | Murai et al. | 363/17 |

*Primary Examiner*—Peter S. Wong
*Assistant Examiner*—Rajnikani B. Patel
*Attorney, Agent, or Firm*—Quarles & Brady

[57] ABSTRACT

A DC to DC converter particularly suited for use to boost or reduce the voltage with single battery systems allows insertion of the battery in either polarity through use of a symmetrical arrangement of solid-state switches which alternate charging an inductor for the DC to DC converter operation and establishing a ground depending on the polarity of the battery. The use of a solid-state switch to establish a ground avoids the severe voltage drop required of rectifier systems.

9 Claims, 2 Drawing Sheets

LOW VOLTAGE POLARITY CORRECTING DC TO DC CONVERTER

CROSS-REFERRENCE TO RELATED APPLICATION

STATEMENT REGARDING FEDERALLY SPONSORED RESEARCH OR DEVELOPMENT

BACKGROUND OF THE INVENTION

DC (direct current) to DC converters are circuits often used to boost a DC voltage, such as may be provided by a battery, to a higher level necessary for the operation of other circuitry. In a common prior art DC to DC converter, an inductor is placed in series with a solid-state switch across a battery. The solid-state switch is activated by a control circuit to periodically conduct current through the inductor, then to open, causing the inductor to produce a high voltage pulse at the junction of the solid-state switch and the inductor. This pulse may be received by a rectifying diode to charge an accumulating capacitor. The voltage on the capacitor is feedback to the control circuit which repeats the charging and interrupting cycle of the inductor until the desired voltage level is produced on the capacitor.

Such DC to DC converters are essential for operating many modern devices such as pagers, cell phones and medical monitors on low voltage battery sources.

Whenever batteries are used in a circuit, the risk of improper battery insertion is present. Improper insertion of a battery may reverse the polarity on the DC to DC converter and thus may damage the DC to DC converter or cause premature drainage of the battery. For this reason, it is known to use battery holders which do not allow the battery to be connected with reverse polarity. Typically, these battery holders include insulating spacers which s prevent contact between the battery terminals and the battery holder terminals when improper insertion has occurred. Unfortunately, with these types of battery holders, improper insertion prevents the device from working at all, even though the circuit has been protected.

It is known that inserting a diode bridge rectifier between the battery and the DC to DC converter will allow the connection of the battery in either polarity. Such a diode bridge, however, is impractical for DC to DC converters which use a single battery cell providing approximately 1.5 volts of input voltage. The diodes of the bridge may cause a voltage drop of as much as 1.4 volts of the available battery voltage.

BRIEF SUMMARY OF THE INVENTION

The present invention provides a DC to DC converter suitable for use with single battery cell applications that allows operation with the battery installed with either polarity. This is accomplished without the drawback of a diode bridge voltage drop by using two solid-state switches in series in place of the single solid-state switch used in the prior art. One solid-state switch continues to provide for pulsed charging of the inductor, while the other is used to establish a ground depending on the polarity of the battery. Because a solid-state switch provides the ground rather than a diode, the voltage drop intrinsic to a diode is not experienced.

Specifically, the present invention provides a DC to DC converter having a first and second input terminal accepting a source of DC voltage of arbitrary polarity. An inductor has a first end attached to the first terminal, and a first and second solid-state switch are connected in series at a junction to together join the second input terminal and the second end of the inductor. A first output terminal receives electrical current from the second end of the inductor and a second output terminal communicates with the junction between the first and second solid-state switches. A control circuit closes the first solid state switch and intermittently closes the second solid-state switch when the first input terminal is positive in polarity with respect to the second input terminal, and closes the second solid-state switch and intermittently closes the first solid-state switch when the first input terminal is negative in polarity with respect to the second input terminal.

Thus, it is one object of the present invention to provide for a DC to DC converter suitable for use with a single battery that can operate with a battery attached in either of the two polarities.

The solid-state switches may be MOSFETs.

Thus, it is another object of the invention to use a switching device having extremely low "on" resistance such as will allow it to be used to establish a ground.

The DC to DC converter may include a battery holder accepting batteries in either of two orientations, with battery terminals contacting battery holder terminals, wherein the first and second input terminals are connected to ones of the battery holder terminals.

Thus, it is another object of the invention to produce a DC to DC converter easily used by consumers that will operate without the consumers' observance of polarity conventions on the battery.

The first and second input terminals may communicate with a rectifier providing a source of voltage to the control circuit of known polarity independent of the polarity of the source of DC voltage connected to the first and second input terminals.

It is another object of the invention to provide a circuit that can make use of off-the-shelf control circuitry that requires a predetermined polarity. A low voltage drop rectifier such as Schottky-type rectifiers may be used for this purpose.

The foregoing and other objects and advantages of the invention will appear from the following description. In this description, references are made to the accompanying drawings which form a part hereof in which are shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
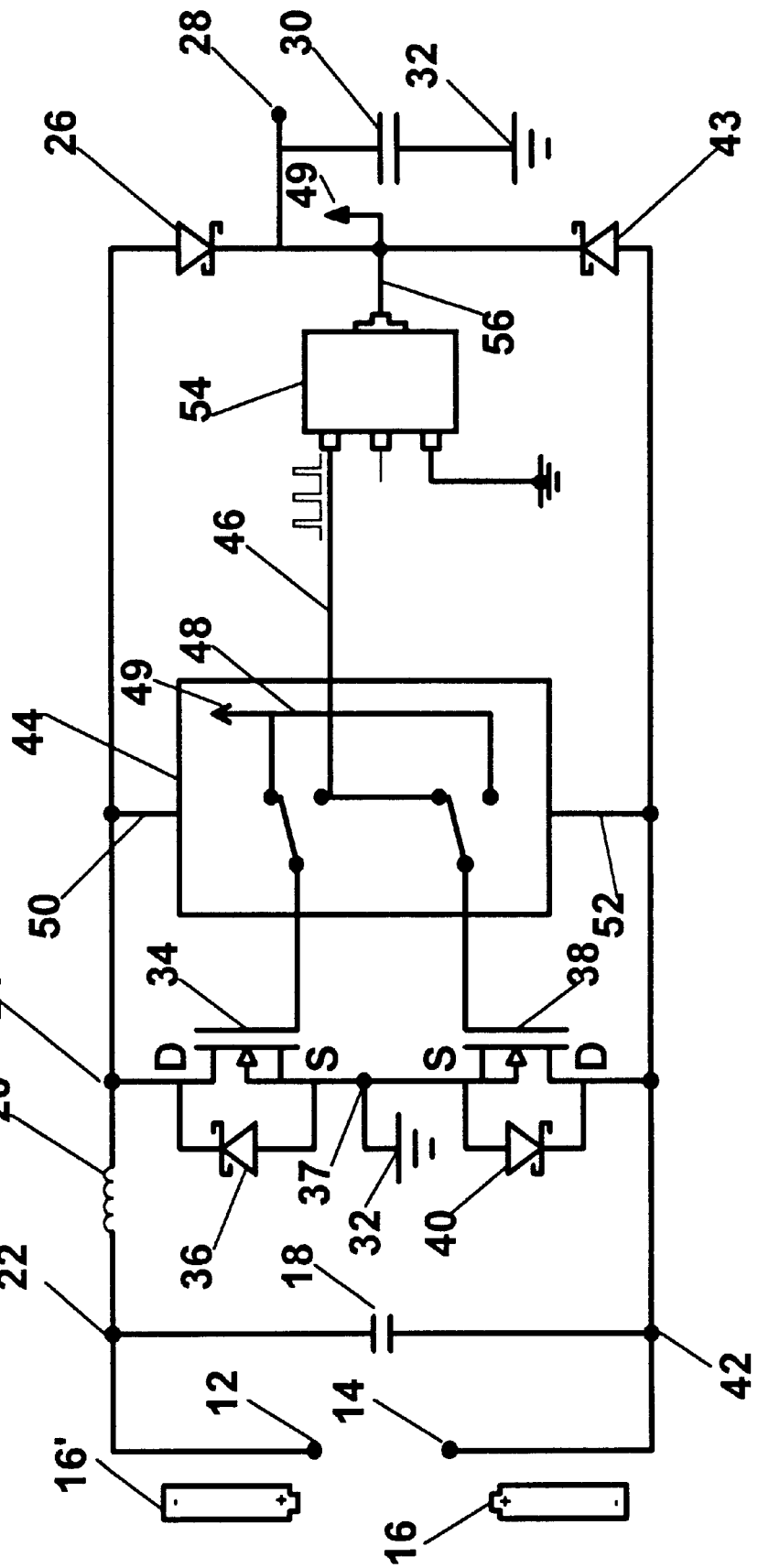
FIG. 1 is a simplified, schematic diagram of the present invention showing input terminals for receiving a battery in either of two orientations and showing control circuitry including a commercially available feedback modulating circuit, followed by a specialized pulse steering circuit.

Referring now to FIG. 1, a DC to DC converter 10 of the present invention provides input terminals 12 and 14 for receiving an axial-type battery 16 having opposed battery terminals in a first position with the positive terminal of the battery contacting input terminal 12 and the negative terminal of the battery 16 contacting input terminal 14, or in a second position (indicated by 16') with the negative terminal of the battery 16' contacting input terminal 12 and the positive terminal of the battery 16' contacting input terminal 14. The two possible positions of the battery 16 and 16' are of opposite polarity.

Bridging input terminals 12 and 14 is a storage capacitor 18 serving to reduce the voltage spikes at terminals 12 and 14 due to switching currents.

The input terminal 12 is connected with one lead of an inductor 20 at junction 22. The second lead of the inductor 20 connects at a junction 24 to the anode of a diode 26 whose cathode is connected to an output terminal 28. The diode 26 may be a Schottky diode having a reduced forward voltage drop of approximately 0.3 volts compared to conventional silicon rectifiers having approximately a 0.7 volt forward voltage drop.

A filter capacitor 30 connects between the output terminal 28 and a ground 32 as will be described below.

Also connected to junction 24 is a first terminal of solid-state switch 34 being an n-channel power MOSFET. The solid state switch 34 has a Schottky barrier diode 36 connected between its source and drain of the MOSFET with the cathode of the diode 36 connected to the drain and the anode of the diode 36 connected to the source.

The source of the MOSFET solid-state switch 34 is connected to the source of a second solid-state switch 38 at junction 37. This junction 37 defines the common ground 32. Solid-state switch 38 also has a barrier Schottky diode 40 attached between its drain and source, again with the cathode of the diode 40 attached to the drain of of the MOSFET and anode of the diode 40 attached to the source of MOSFET solid-state switch 38.

The drain of the MOSFET solid-state switch 38 attaches to input terminal 14 and to the remaining lead of capacitor 18 at junction 42. Junction 42 also connects to the anode of Schottky diode 43 whose cathode connects to output terminal 28.

The gates of the MOSFETs solid-state switches 34 and 38 are attached to a pulse steering circuit 44 which selectively connects the gates between a pulse source 46 and a positive voltage source 48 depending on the polarity of the battery connection to input terminals 12 and 14. Specifically, the gate of solid-state switch 34 is connected to the pulse source 46 and the gate of solid-state switch 38 is connected to the source of positive voltage when input terminal 12 is positive with respect to input terminal 14 per battery 16, and the gate of solid-state switch 34 is connected to the positive voltage and the gate of solid-state switch 38 is connected to the pulse source 46 (as shown in FIG. 1) when the input terminal 12 is negative than the input terminal 14 per battery 16'. The circuitry for implementing the pulse steering circuit 44 will be described below.

The pulse steering circuit 44 has a first lead 50 connecting to junction 24 and a second lead 52 connecting to junction 42 so as to be able to deduce the polarity of the battery 16 or 16' as will be described.

The pulse source 46 is generated by a feedback modulating circuit 54, which in the preferred embodiment, is a pulse frequency modulating regulator. Feedback line 56 connects to the output terminal 28 as described so as to provide regulation of the output voltage. Specifically, if the feedback line 56 drops below a preset desired output voltage, the frequency of the pulse source 46 is increased. The modulating circuit 54 may be any one of a number of commercially available integrated circuits such as the MC33463-33KTI manufactured by Motorola, Inc. or the Max866 made by Maxim Integrated Products of Sunnyvale, Calif. Alternatively, a pulse width modulating type of circuit may be used as will be understood to those of ordinary skill in the art after reading the following description.

Referring still to FIG. 1, when the input terminal 12 is more positive than the input terminal 14, per battery 16, solid-state switch 38 has its gate switched to a source of positive voltage (not shown in FIG. 1) turning it on to produce an on resistance as small as 0.07 ohms at a gate drive voltage of 2.7 volts. This high drive voltage can be provided even with a single battery by the boot-strapping effect of using the output voltage of the DC to DC converter 10 at terminal 28 as will be discussed further below. Thus, solid-state switch 38 pulls ground 32 close to the value of the voltage on input terminal 14, establishing ground for the output voltage 28 and various components of the DC to DC converter including the pulse steering circuit 44 and the modulating circuit 54.

The solid-state switch 34, in contrast, is connected to the pulse source 46 to repeatedly turn on and off. With each turning on of the solid-state switch 34, current is drawn through inductor 20. When solid-state switch 34 is turned off, the magnetic flux of the inductor collapses causing a high voltage pulse to occur at junction 24 which forward biases diode 26 to charge the capacitor 30 at output terminal 28. So long as the voltage at output terminal 28 is below the preset voltage, the modulating circuit 54 keeps sending these charge/recharge cycles to increase the charge on the capacitor 30. Conversely, when capacitor 30 has been charged so that output terminal 28 is at its desired voltage value, the modulating circuit 54 stops the pulses on the pulse source 46, thus reducing its own current usage and the current drawn from the battery 16.

When the battery 16' orientation occurs, so that input terminal 14 is more positive than input terminal 12, solid-state switch 34 is turned on to pull ground 32 close to the value of input terminal 12. Solid-state switch 38 is connected to the pulse source 46 to turn on and off. When solid-state switch 38 is turned on, current flows from the positive terminals of the battery 16' into 14, through the solid-state swtiches 38 and 34 into junction 24 of the inductor and out through junction 22 and back into negative of the battery. When solid-state switch 38 turns off, the magnetix flux of the inductor collapses, a high voltage pulse is generated by the inductor 20 making junction 22 more positive than junction 24. This voltage pulse adds in series with the battery voltage to forward bias diode 43 charging capacitor 30 on output terminal 28 as before. Again, the switching action is controlled by the modulating circuit 54, monitoring the voltage on the output terminal 28 by feedback line 56.

The pulse steering circuit 44 and modulating circuit 54 may derive their power initially from the battery through either diode 26 or diode 43 at the battery voltage minus the drops across diodes 26 or 43, but later derive their power from the higher voltage maintained on capacitor 30 thus improving its performance.

Figure 2:
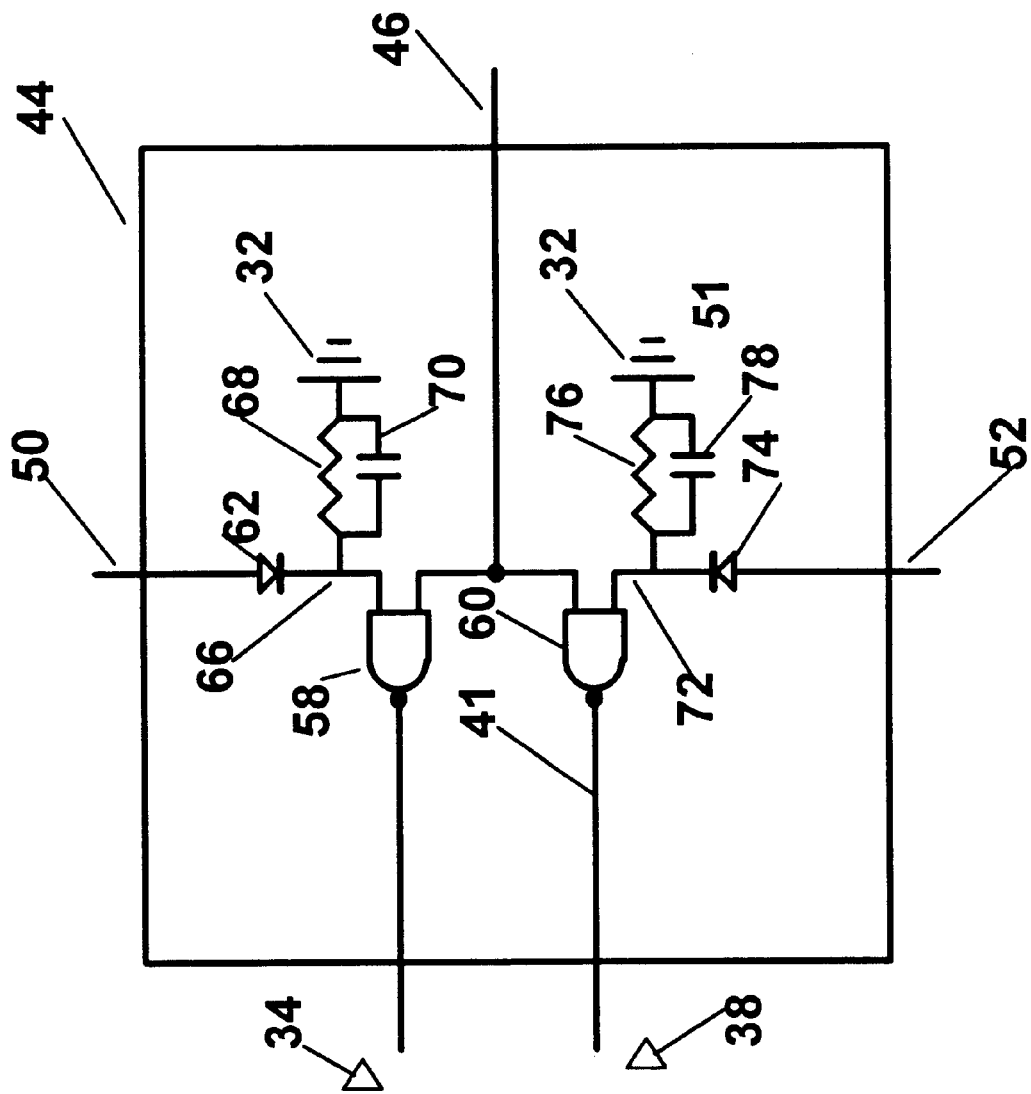
FIG. 2 is a detailed view of the pulse steering circuit of FIG. 1.

Referring now to FIG. 2, the pulse steering circuit 44 includes two dual input NAND gates 58 and 60, the output of NAND gate 58 connecting to the gate of solid-state switch 34 and the output of NAND gate 60 connecting to the gate of solid-state switch 38. One input of each of the NAND gates 58 and 60 connects to the pulse source 46. The remaining input of NAND gate 58 connects to junction 66 connected to the cathode of diode 62 whose anode connects to first lead 50, ultimately connected to junction 24 as has been described. Junction 66 also connects through parallel-connected resistor 68 and capacitor 70 to ground 32. Thus, referring to FIGS. 1 and 2, when the battery 16 is inserted with input terminal 12 being more positive than input terminal 14, then junction 66 is positive, causing the output of NAND gate 58 to transmit the pulses of the pulse source 46.

When the battery 16' is inserted, diode 62 is reversed and the input of the NAND gate 58 connected to junction 66 is low, causing the output of the NAND gate to become logic high, thus closing switch 34 which grounds junction 24, without transmitting the pulses of the pulse source 46. Thus, the logic described with respect to FIG. 1 is completed for the solid-state switch 34.

Similarly, the second input of NAND gate 60 connects to a junction 72, also connected to the cathode of a diode 74 whose anode connects to second lead 52, ultimately communicating with junction 42. The junction 72 also is connected to the parallel combination of resistor 76 and capacitor 78 to ground 32. Thus, when the battery 16 is in place, diode 74 is reverse biased, causing the output of NAND gate 60 to rise to a logic high value, not transmitting the pulses of the pulse source 46. Conversely, when the battery 16' is in place, the NAND gate 60 transmits the pulses from pulse source 46 according to the logic previously described.

The NAND gates 58 and 60 may be powered from the output terminal 28, thus originally obtaining voltage through diodes 26 and 43 from the battery, and later being bootstrapped by the higher output voltage at output terminal 28.

Prior to the pulse steering circuit 44 applying an on current to one of solid-state switches 34 and 38 to establish ground 32, biasing is provided by diodes 40 and 36 to ensure the proper switching of the pulse steering circuit 44. Capacitors 70 and 74 filter voltage ripple.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A DC to DC converter comprising:

a first and second input terminal accepting a source of DC voltage of arbitrary polarity;

an inductor having a first end attached to the first terminal;

a first and second switch connected in series at a junction to together join the second input terminal and a second end of the inductor;

a first output terminal receiving electrical current from the second end of the inductor and a second output terminal communicating with the junction between the first and second solid-state switches; and a control circuit closing the first solid-state switch and intermittently closing the second solid-state switch when the first input terminal is positive in polarity with respect to the second input terminal and closing the second solid-state switch and intermittently closing the first solid-state switch when the first input terminal is positive in polarity with respect to the second input terminal.

2. The DC to DC converter of claim 1 wherein the solid-state switches are MOSFETs.

3. The DC to DC converter of claim 1 including a battery holder accepting batteries in either of two orientations with battery terminals contacting battery holder terminals and wherein the first and second input terminals are connected to ones of the battery holder terminals.

4. The DC to DC converter of claim 1 wherein the first and second input terminals communicate with a rectifier providing a source of voltage to the control circuit of known polarity independent of the polarity of the source of DC voltage connected to the first and second input terminals.

5. The DC to DC converter of claim 4 wherein the rectifier uses Schottky diodes.

6. The DC to DC converter of claim 1 wherein the control circuit includes:

a feedback modulating circuit providing switching pulses at a pulse output in response to a voltage signal at a feedback input; and a pulse steering circuit receiving the switching pulses from the pulse output and steering them to control lines of one of the solid-state switches bases on the polarity of the DC source;

wherein the feedback input is connected to the first terminal.

7. The DC to DC converter of claim 1 wherein the feedback modulating circuit is a pulse width modulating circuit.

8. The DC to DC converter of claim 1 wherein the feedback modulating circuit is a pulse frequency modulating circuit.

9. The DC to DC converter of claim 1 wherein a Schottky diode connects the first input terminal with the first output terminal.

* * * * *